United States Patent

Nixon

[15] 3,687,344
[45] Aug. 29, 1972

[54] REAR MOUNTED SNOWMOBILE CARGO BOX WITH TOW BAR EXTENSION

[72] Inventor: Paul A. Nixon, Rt. #1, 156 Reser Rd., Walla Walla, Wash. 99362

[22] Filed: Oct. 2, 1970

[21] Appl. No.: 77,500

[52] U.S. Cl. ..................224/29 R, 224/42.03 A
[51] Int. Cl. ..............................B60r 9/00
[58] Field of Search .....224/42.03 R, 42.03 A, 42.07, 224/42.08, 29 R; 280/482

[56] References Cited

UNITED STATES PATENTS

| | | |
|---|---|---|
| 1,776,890 | 9/1930 | Dart...................224/42.03 A |
| 1,733,347 | 10/1929 | Holmes...............224/42.03 A |
| 3,228,576 | 1/1966 | Gaukel................224/42.03 A |
| 3,251,520 | 5/1966 | Van Dyke et al......224/42.06 |
| 1,817,056 | 8/1931 | Belgard................224/42.07 |

*Primary Examiner*—Gerald M. Forlenza
*Assistant Examiner*—Lawrence J. Oresky
*Attorney*—Clarence A. O'Brien and Harvey B. Jacobson

[57] ABSTRACT

A cargo receptacle has clip members mounted on one wall thereof which engages a rear brace member of a snow vehicle frame. A tow bar extension is attached to the bottom wall of the receptacle, the extension being secured to the tow bar of the snow vehicle. The extension extends rearwardly beyond the receptacle thereby allowing a cargo sled to be tied thereto.

5 Claims, 4 Drawing Figures

Patented Aug. 29, 1972

Paul A. Nixon
INVENTOR.

BY *Clarence A. O'Brien*
*and Harvey B. Jacobson*
Attorneys

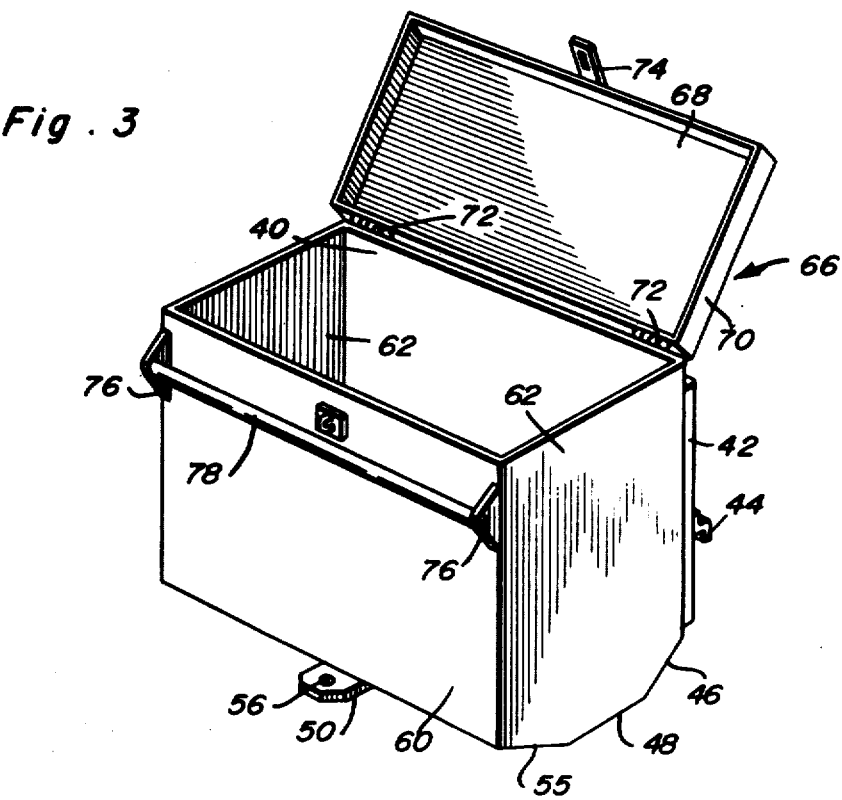
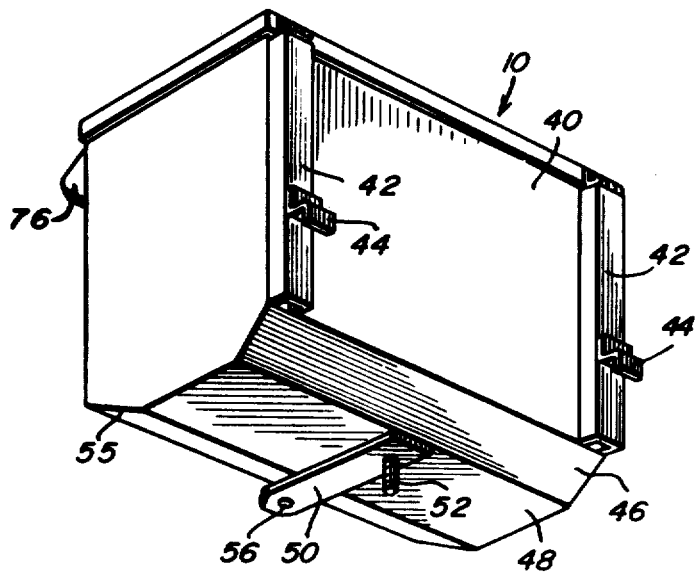
Paul A. Nixon 3,687,344

REAR MOUNTED SNOWMOBILE CARGO BOX WITH TOW BAR EXTENSION

BACKGROUND OF THE INVENTION

The present invention relates to storage receptacles and more particularly to a receptacle adapted to be removably mounted to the rear of a snow vehicle frame.

During the present time, snow vehicles have met with wide acceptance both as means of transportation and sport. Due to the space limitations inherent in such vehicles, users have found it difficult to carry cargo. The most prevalent method is to attach a sled to a tow bar that extends rearwardly from the snow vehicle frame. Although this method of cargo carrying is desirable for large loads, the fact that the snow vehicle tow a sled behind it decreases the maneuverability of the vehicle. Accordingly, when small loads are involved, snow vehicle users must either resort to stuffing their pockets with small articles or using a partially loaded sled.

SUMMARY OF THE INVENTION

The present invention is particularly adapted to accommodate a snow vehicle user who must carry a cargo load which is less than a heavy and full load that is preferably carried on a sled. The present cargo carrier is simple in structure and therefore relatively inexpensive to fabricate and purchase. The invention includes several novel features which allow a snow vehicle user to attach and remove the device rapidly and conveniently as well as providing a tow bar extension to which a cargo sled can be tied for additional storage.

The cargo box of the present invention includes a hinged lid having a peripheral lip which assists in weatherproofing the interior of the box. A lifting handle is secured to the walls of the box thereby enabling the user to easily lift the box during placement and removal from the vehicle. The design of the present invention is adaptable to snow vehicles made by various manufacturers. The cargo box remains elevated above the ground and is compact in size so that there is little interference with the maneuverability of the snow vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a perspective view illustrating an opened cargo box.

FIG. 4 is a perspective view illustrating the bottom appearance of the box.

Figure 1:
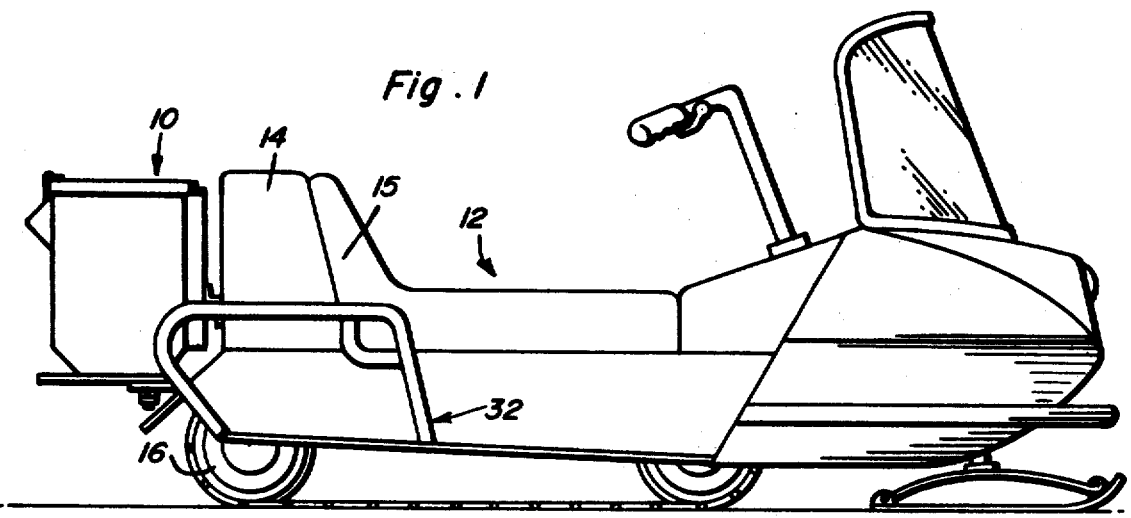
FIG. 1 is a side elevational view of the present cargo box as installed on a snow vehicle.

Referring to the drawings, and more particularly FIG. 1, reference numeral 10 generally indicates the cargo box of the present invention as mounted on a conventional snow vehicle 12. More particularly, the cargo box is mounted rearwardly adjacent the gas reservoir that is fastened behind the seat 15 of the snow vehicle. Usually, this reservoir is located vertically above the rear track driving member 16. Viewing FIG. 2, the reservoir 14 is seen to include a box-like container 18 having signal lights 20 mounted along the rear wall thereof. A lower reservoir portion 22 is rearwardly offset from the main body portion 18 thereby forming a ledge 24. This ledge is perpendicularly oriented with respect to a vertically disposed integral wall 26 that forms part of the lower portion of reservoir 14. The bottom 28 of reservoir 14 is seated upon the body 30 of the vehicle. This body includes a rearwardly extending sloping surface 31 that is positioned in obtuse angular relation with the vertical wall portion 26 of reservoir 14. Laterally disposed rail members 32 are positioned adjacent the lateral sides of reservoir 14 as will be seen in FIG. 1.

Figure 2:
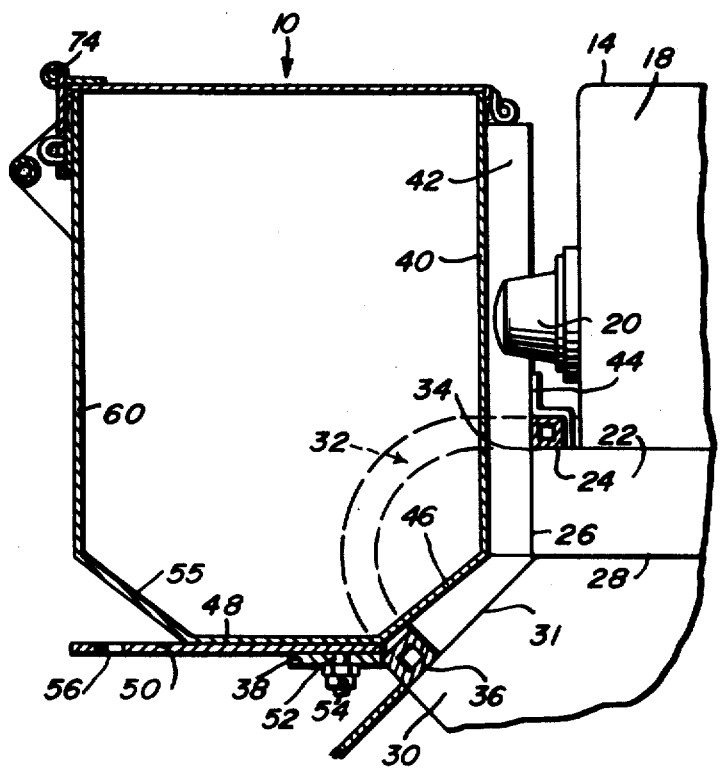
FIG. 2 is a vertical sectional view taken through the box.

Concentrating on FIG. 2, a horizontal brace 34 rests on ledge 24 formed in reservoir 14. The brace is a portion of the vehicle frame and has a hollow square cross-section. A similar brace 36 is suitably fastened to the lower inclined surface 31 and serves as a mounting member for a horizontal tow bar 38 that extends rearwardly. Various makes of snow vehicles may not necessarily include the exact components as described. Minor modifications of the attachment components may be necessary to accommodate various snow vehicle designs.

The cargo box includes a rear wall 40 that is positioned adjacent the signal lamps 20. As shown in FIG. 4, the rear wall 40 mounts two parallel spaced channel members 42 that are suitably welded or otherwise connected along the vertical edges of the rear wall 40. The channel members 42 space the rear wall 40 from the lamps 20. Z-shaped clips or brackets 44 are suitably connected along aligned intermediate points of the channel members, the clips serving to engage the brace 34 (FIG. 2). The lower edge of rear wall 40 extends downwardly and centrally to form an inclined surface 46 that articulates at its lower edge to a bottom wall 48. The bottom wall in turn extends to another inclined surface 55 symmetrical with the previously mentioned surface 46.

Mounting means in the form of a flat bar 50 is attached to the bottom wall 48 and extends thereacross. A threaded member 52 extends downwardly from the lower side of bar 50 and as will be observed in FIG. 2, the threaded member passes through the opening formed in the usual tow bar 38 of the snow vehicle. A nut member 54 secures the bar 38 against the tow bar 50. Thus, as will be observed from FIG. 2, bar 50 serves as an extension tow bar. An opening 56 is formed at the free end of the extension tow bar to allow securement of a rope or hitch thereto. Accordingly, the rope of a cargo sled can be received in opening 56. With use of both the cargo box and a cargo sled, the cargo capacity of the snowmobile is greatly increased. A second vertical box wall 60 is positioned in parallel spaced relation to the rear wall 40 and transverse walls 62 complete the peripheral enclosure of the cargo box.

Inasmuch as it is desirable to provide a closure or lid for the box, a lid generally indicated by 66 is hingedly mounted to the upper part of the cargo box. The lid includes a central body portion 68 and a peripheral rectangular lip 70 that overlaps mating edges of the box side walls. This overlapping feature resists entry of rain into the box during inclement weather. Hinges 72 are secured between the lid 66 and the rear wall 40. A hasp 74 is connected to the lid 66 and side wall 60 to allow the lid to be locked.

In order to facilitate manipulation of the cargo box onto and off from the vehicle, a horizontal handle or bar 78 extends between the transverse side walls 62. This handle also facilitates lifting of the rear end of the snow vehicle. Flanges 76 connected at the outward ends of the bar 78 are attached to the side walls 60.

As will be appreciated by a review of the foregoing description, the present invention offers a simply constructed and extremely convenient means for carrying cargo in a snow vehicle.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention.

What is claimed as new is as follows:

1. In combination with a vehicle of the type having front and rear ends and a fixed, horizontally disposed and rearwardly projecting tow bar supported from the rear end of said vehicle, said tow bar having a vertically extending aperture formed through its rear end portion for attachment of a suitable hitch member thereto, a removable cargo box for support from the rear of said vehicle, said cargo box including front and rear portions and a bottom wall, a front to rear extending extension bar secured to the undersurface of said bottom wall, the front end of said extension bar including a depending shank portion downwardly receivable through said aperture, the rear end of said extension bar projecting rearwardly of the rear of said bottom wall and including a vertically extending aperture formed therethrough rearward of said bottom wall for attachment of a suitable hitch member thereto, the front portion of said cargo box above said bottom wall and the rear end of said vehicle including coacting means releasably attaching said cargo box to said vehicle with said box disposed in a position with said extension bar overlying and supported from said tow bar and said depending shank portion projecting downwardly through the aperture in said tow bar for securement therethrough.

2. The combination of claim 1 wherein said coacting means includes forwardly projecting downwardly opening hook means carried by said box and a horizontal transverse member carried by said vehicle over which said hook means are engagable as a result of proper downward displacement of said box relative to said vehicle.

3. The combination of claim 1 wherein said box opens upwardly and is provided with a cover removably positionable in a position closing the open upper end of said box.

4. The combination of claim 1 wherein said rear portion of said box comprises a rear transverse wall thereof, the apertured rear end portion of said extension being disposed forward of said rear transverse wall.

5. The combination of claim 4 wherein said coacting means includes forwardly projecting downwardly opening hook means carried by said box and a horizontal transverse member carried by said vehicle over which said hook means are engagable as a result of proper downward displacement of said box relative to said vehicle.

* * * * *